United States Patent
Blommer et al.

(10) Patent No.: US 9,761,223 B2
(45) Date of Patent: Sep. 12, 2017

(54) ACOUSTIC IMPULSE RESPONSE SIMULATION

(71) Applicant: Ford Global Technologies, LLC, Dearborn, MI (US)

(72) Inventors: Michael Alan Blommer, Ann Arbor, MI (US); Scott Andrew Amman, Milford, MI (US); Brigitte Frances Mora Richardson, West Bloomfield, MI (US); Francois Charette, Canton, MI (US); Mark Edward Porter, South Lyon, MI (US); Gintaras Vincent Puskorius, Novi, MI (US); Anthony Dwayne Cooprider, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/512,578

(22) Filed: Oct. 13, 2014

(65) Prior Publication Data
US 2016/0104479 A1    Apr. 14, 2016

(51) Int. Cl.
*G10L 15/02* (2006.01)
*G10L 15/08* (2006.01)
(Continued)

(52) U.S. Cl.
CPC .............. *G10L 15/08* (2013.01); *G10L 15/01* (2013.01); *G10L 17/22* (2013.01)

(58) Field of Classification Search
CPC ......... G10L 15/22; G10L 15/30; G10L 15/20; G10L 21/0208; G10L 15/00; G10L 25/78; G10L 21/02; G10L 15/06; B60R 16/0373; B60R 16/037; B60R 25/102; B60R 2001/1215; B60R 2325/205; B60R 11/0264; B60R 11/0217; B60R 11/0258
(Continued)

(56) References Cited

U.S. PATENT DOCUMENTS 7,676,363 B2    3/2010 Chengalvarayan et al.
8,756,062 B2 *  6/2014 Talwar .................. G10L 15/065
                                                          704/243
(Continued)

FOREIGN PATENT DOCUMENTS

CN          101269638 A        9/2008
DE    WO 2009100968 A1 *    8/2009    ......... G10K 11/1788
(Continued)

OTHER PUBLICATIONS

International Telecommunication Union, ITU-T, P.1100 (Mar. 2001), "Series P: Terminals and Subjective and Objective Assessment Methods" (114 pages).
(Continued)

*Primary Examiner* — Marivelisse Santiago Cordero
*Assistant Examiner* — Stephen Brinich
(74) *Attorney, Agent, or Firm* — Frank A. MacKenzie; Bejin Bieneman PLC

(57) ABSTRACT

At least one spoken utterance and a stored vehicle acoustic impulse response can be provided to a computing device. The computing device is programmed to provide at least one speech file based at least in part on the spoken utterance and the vehicle acoustic impulse response.

20 Claims, 4 Drawing Sheets

(51) Int. Cl.
*G10L 15/01* (2013.01)
*G10L 17/22* (2013.01)

(58) Field of Classification Search
USPC ............... 704/3, 7, 246–255, 257, 200–201,
704/225–226, 231, 243, 270
See application file for complete search history.

(56) References Cited

U.S. PATENT DOCUMENTS

| | | | |
|---|---|---|---|
| 2006/0149457 A1* | 7/2006 | Ross | G10L 15/30 |
| | | | 701/117 |
| 2007/0073539 A1* | 3/2007 | Chengalvarayan | G10L 15/20 |
| | | | 704/245 |
| 2008/0010057 A1* | 1/2008 | Chengalvarayan | G10L 15/065 |
| | | | 704/9 |
| 2009/0198492 A1 | 8/2009 | Rempel | |
| 2013/0304475 A1* | 11/2013 | Gratke | H04R 3/00 |
| | | | 704/270 |
| 2013/0311175 A1 | 11/2013 | Arakawa et al. | |

FOREIGN PATENT DOCUMENTS

| | | |
|---|---|---|
| JP | 2007025076 A | 2/2007 |
| JP | 2008105608 A | 5/2008 |

OTHER PUBLICATIONS

International Telecommunication Union, ITU-T, P.1110 (Dec. 2009), "Series P: Terminals and Subjective and Objective Assessments Methods" (112 pages).

\* cited by examiner

ACOUSTIC IMPULSE RESPONSE SIMULATION

BACKGROUND

Speech recognition systems and/or hands-free calling systems may be provided in automobile cabins. However, achieving good speech recognition and/or good hands-free phone call quality in a vehicle can be problematic due to the extremely noisy nature of the vehicle environment. Sources of noise include the sounds generated by wind, mechanical and structural features, tires, passengers, engine, exhaust, HVAC air pressure, etc. Cabin acoustics also affect speech recognition and hands-free call quality. Vehicle interior materials, geometry, etc., will have an impact on the propagation of a user's voice to a hands-free microphone responsible for speech recognition and/or hand-free phone calling tasks.

The traditional approach to training and evaluation of a speech recognition engine or the evaluation of the hands-free call quality includes driving vehicles under various test conditions over various road surfaces. A person's utterances embedded in various vehicle background sounds are recorded at the output of a hands-free microphone. These recordings are then used for subsequent speech recognition or for hands-free phone call evaluation. This traditional approach is very time consuming, logistically difficult, expensive, and fraught with experimental variability.

DRAWINGS

DESCRIPTION

Disclosed herein is an advantageous system and method that includes a vehicle cabin acoustic impulse response in generating speech files for use in speech recognition training and/or evaluation, hands-free microphone evaluation, etc. The presently disclosed subject matter advantageously eliminates the need for long-term or sustained use of a vehicle because a vehicle is only needed for generally a one-time recording of the background noise conditions and the cabin impulse response. After that, the vehicle is not necessary. Cabin impulse responses, and typically also recorded background noises, can be combined with spoken utterances that may be provided in real-time in a lab environment, and/or from a pre-recorded database. The disclosed system and method also has the potential to generate large speech databases that may be used for a number of purposes, including the training of automatic speech recognition engines.

Figure 1:
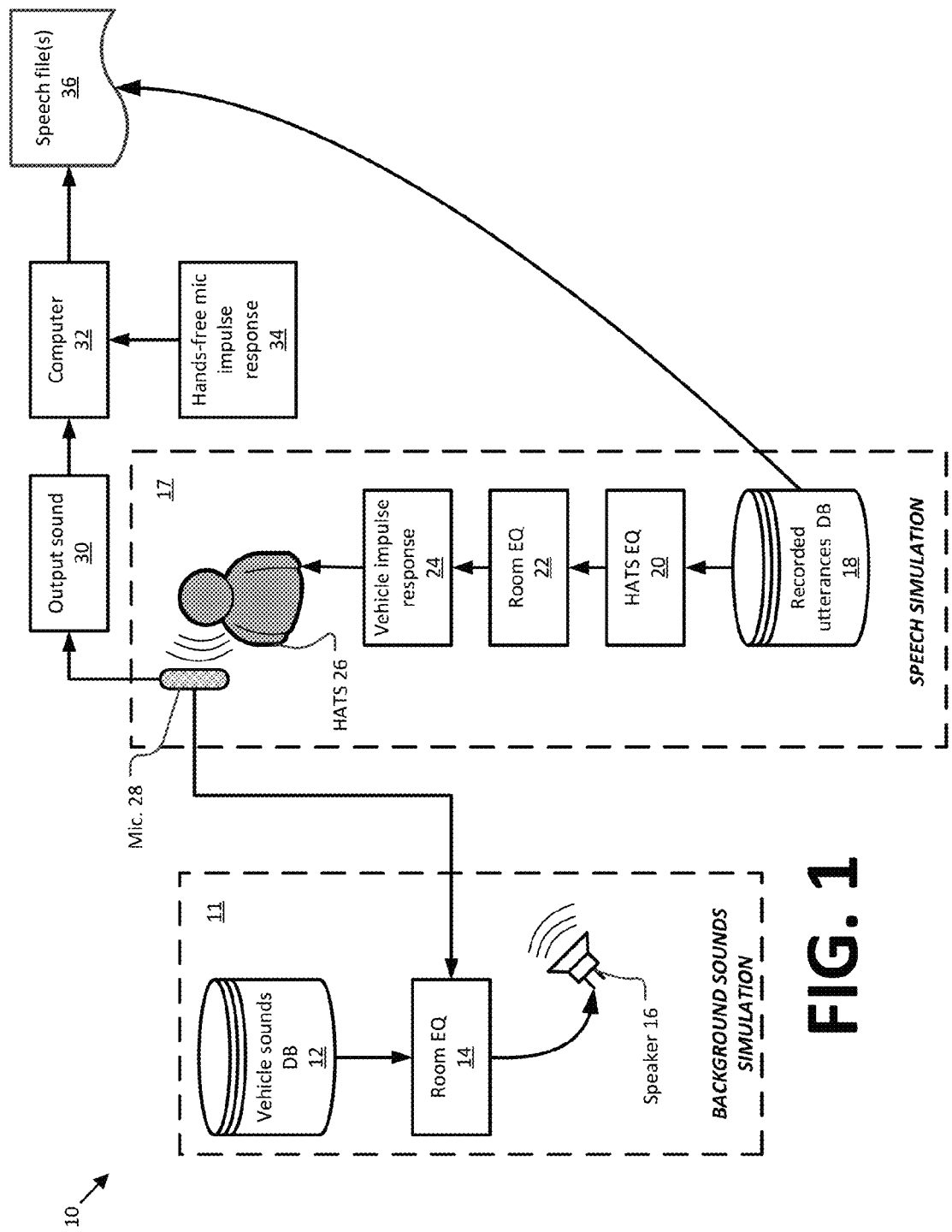
FIG. 1 is a block diagram of a first exemplary system for generating vehicle speech files.

FIG. 1 is a block diagram of a first exemplary system 10 for generating vehicle speech files 36. The system 10 includes a subsystem 11 for generating vehicle background sounds. A vehicle sounds database 12 stores sounds recorded from a vehicle. For example, a vehicle may be driven on a test track according to various parameters, e.g., different road surfaces, different speeds, different environmental conditions, etc. Sound files may be recorded, e.g., using a recording device having microphones located at one or more locations in a vehicle cabin, for various permutations of such parameters, and stored in the database 12.

A room equalizer 14 may be provided in a known manner to adjust sounds provided from files in the sounds database 12 according to acoustic characteristics of a room, laboratory, etc., in which a speaker 16 is located. The purpose of using the equalizer 14 is to cause sounds from the speaker 16 to have a same or similar spectral shape that frequencies of recorded sounds in the database 12 would have had if provided to a hands-free microphone in a vehicle according to the parameters with which the sounds were recorded. For example, an equalizer 14 could be adjusted according to known characteristics of a room, and readjusted only when a room configuration, i.e., room acoustics, were changed. Alternatively, an equalizer 14 could be controlled in real-time or substantially real-time by monitoring input to the microphone 28 and adjusting the equalizer 14 based on this input to provide a flat frequency response at the microphone 28 with respect to sounds from the speaker 16 played in the room. Yet further alternatively, an acoustic impulse response of a room, laboratory, etc. could be measured, and could be convolved with vehicle sounds in database 12.

The speaker 16 is used to play sounds from the database 12. Note that one speaker 16 is included in FIG. 1, and referred to in the present description, for ease of description and illustration, but the subsystem 11 could include multiple speakers 16 located at different locations in a room, laboratory, etc. Further, it will be understood that the equalizer 14 could be adjusted differently for different speakers 16 at different locations in a room.

The system 10 further includes a subsystem 17 for simulating vehicle occupant speech. i.e., for providing one or more spoken utterances. A microphone 28 receives sound played through the speaker 16 and a head and torso simulator (HATS) 26, such as is known. The subsystem 17 further includes a recorded utterances database 18 that includes one or more sound files recorded from utterances by a human speaker in a quiet, non-reverberant environment. For example, the sound files in the database 18 could include commands to a hands-free phone system, sample utterances for speech recognition training, etc. The sound files are provided from the recorded utterances database 18 to the HATS 26. A HATS equalizer 20 and a room equalizer 22 are provided to adjust the sound files from the recorded utterances database 18 before sounds are output from the HATS 26. The purpose of using the HATS equalizer 20 in addition to the room equalizer 22 is to prevent utterances from the database 18 from being spectrally altered by the HATS 26 when sounds are output from the HATS 26. The room equalizer 22 is different from the room equalizer 14, in that the room equalizer 22 will provide a flat frequency response from the HATS mouth to the microphone whereas room equalizer 14 provides a flat frequency response from the speaker 16 to the microphone.

Further, a computing device having a processor and a memory may adjust sounds from the recorded utterances database 18 using a stored vehicle acoustic impulse response 24. That is, the impulse response 24 may be convolved with equalized recorded utterances to generate utterances from the HATS 26 at microphone 28 with spectral shaping and reverberation that would be present due to vehicle cabin acoustics. An acoustic impulse response 24 may be measured in a known manner, and, as is known, describes acoustic characteristics of an acoustic space or enclosure.

Once sounds from the database 18 are processed by the equalizers 20, 22, and according to the vehicle impulse response 24, as described above, and while sounds from the vehicle sounds database 12, processed by the equalizer 14 are played via the speaker 16, as also described above, the HATS 26 may be used to provide recorded utterances to the microphone 28, thereby producing output sounds 30 that include the vehicle sounds produced by speaker 16. The output sounds 30 may be provided to a computer 32, i.e., a device having a processor and a memory, the memory storing instructions executable by the processor for carrying out various steps including steps described herein. The computer 32 may use the output sounds 30 to generate one or more speech files 36.

Further, beyond simply digitizing sounds received via the microphone 28 into a sound file such as a WAV file or the like, the computer 32 may perform additional processing. For example, when a purpose of generating a speech file or files 36 is to evaluate a hands-free microphone in a vehicle, a hands-free microphone impulse response 34 may be applied to the output sounds 30 in generating a speech file or files 36. As noted above, an acoustic impulse response such as the microphone impulse response 34 is known, and moreover may be convolved with output sounds 30 to generate speech files 36.

Speech files 36 may be used in a variety of manners to evaluate hands-free call quality or the performance of automatic speech recognition systems. For example, hands-free call quality can be evaluated by applying the speech files 36 to a hands-free phone processing system that produces a Bluetooth output signal or the like. This Bluetooth output signal, along with speech files from utterance database 18 and output sound 30 provide the necessary signals for execution of European Telecommunications Standards Institute (ETSI) standards EG 202 396-3 and TS 103 106. Other hands-free call quality measures may also be employed with these signals. Additionally, the speech data from the Bluetooth output, sound output 30, or speech files 36 may be supplied to an automatic speech recognition engine to evaluate the performance of the speech recognition engine with speech utterances influenced by vehicle background noise, vehicle acoustics, hands-free microphone frequency response and Bluetooth processing. The speech files may also be used for the training of automatic speech recognition engines.

Figure 2:
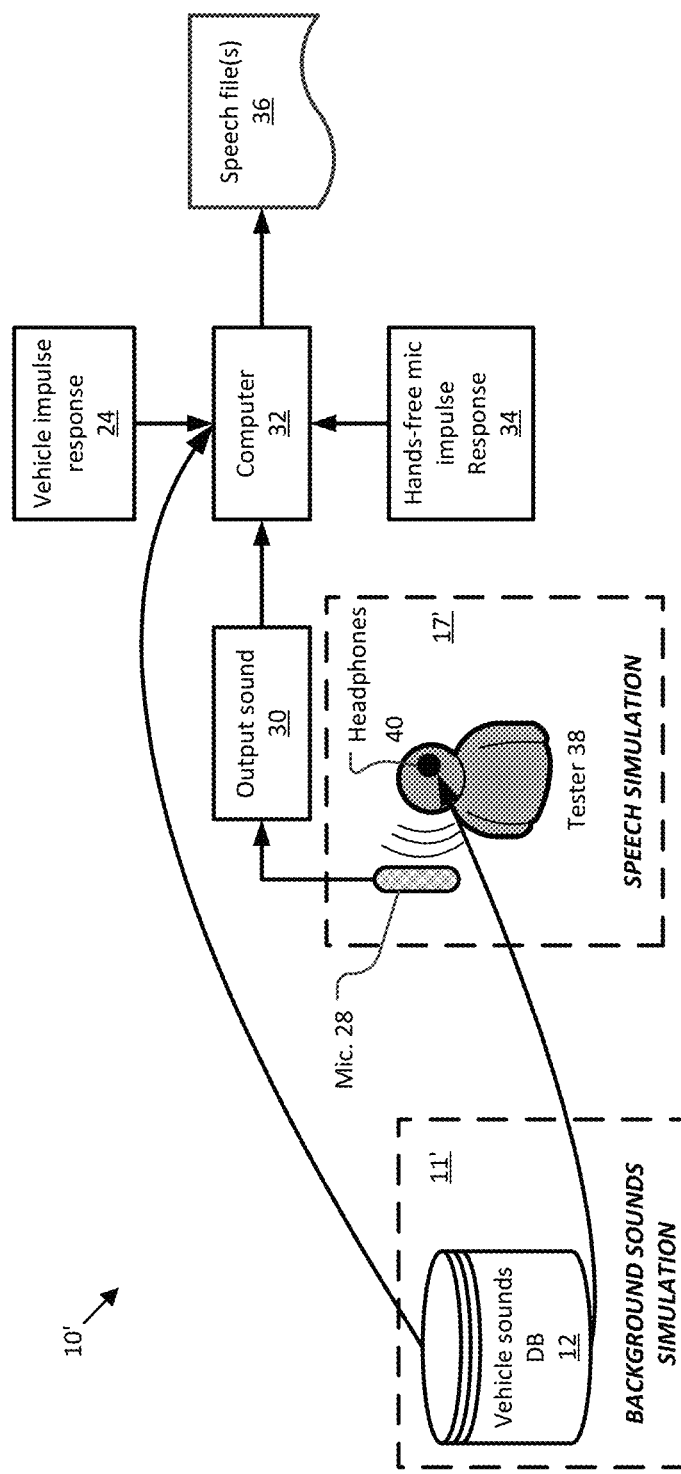
FIG. 2 is a block diagram of a second exemplary system for generating vehicle speech files.

FIG. 2 is a block diagram of a second exemplary system 10' for generating vehicle speech files 36. Instead of the HATS 26, the system 10' uses a human tester 38 to provide utterances to the microphone 28. Accordingly, the background sound simulation subsystem 11' of the system 10' omits the room equalizer 14 and speaker 16 seen in the subsystem 11 of the system 10. Instead, in the system 10', sounds are provided directly from the vehicle sounds database 12 to headphones 40 that may be worn by the tester 38. The purpose of providing vehicle sounds to the headphones 40 is to account for the so-called Lombard effect, i.e., a phenomenon whereby humans may adjust a volume and/or tone of speech to compensate for background noise.

Further, the speech simulation subsystem 17' of the system 10' omits the recorded utterances database 18, along with the equalizers 20, 22, because utterances are provided by the tester 38 to the "close-talk" microphone 28, and therefore utterances from the database 18 are not needed. (Note that headphone equalization of sounds from the background sounds database 12 provided to the headphones 40 could be included to provide a flat frequency response for the headphones.) Unlike the system 10, in the system 10' the microphone 28 is located sufficiently close to the speaker so that the equalizer 22 included in the system 10 is not needed. Instead, output sounds 30 are provided from the microphone 28 based on speech received from the tester 38. The computer 32 may then convolve the sounds 30 with the vehicle impulse response 34. The convolved utterance is then added to the vehicle background noise from vehicle sounds database 12. The result is then convolved with the hands-free microphone response 34 to generate one or more speech files 36 that have imposed upon them the influence of a hands-free microphone, vehicle acoustics and vehicle background noise.

Output signals such as those described for the system 10 are also available for hands-free call quality and speech recognition evaluation in the system 10'. The microphone 28 output of the system 10' is generally equivalent to data stored in the utterance database 18 of the system 10. The output sound 30 convolved with the vehicle impulse response 24 with the addition of vehicle background noise from the vehicle sounds database 12 could provide a generally equivalent signal to that of output sound 30 from the system 10. Finally, the application of the speech files 36 to a hand-free phone processing system which produces a Bluetooth output signal or the like would provide the necessary signals for hands-free call quality evaluation. Additionally, the speech data from the Bluetooth output, output sound 30, or speech files 36 may be supplied to an automatic speech recognition engine to evaluate the performance of the speech recognition engine with speech utterances influenced by vehicle background noise, vehicle acoustics, hands-free microphone frequency response and Bluetooth processing. The speech files may also be used for the training of automatic speech recognition engines.

Figure 3:
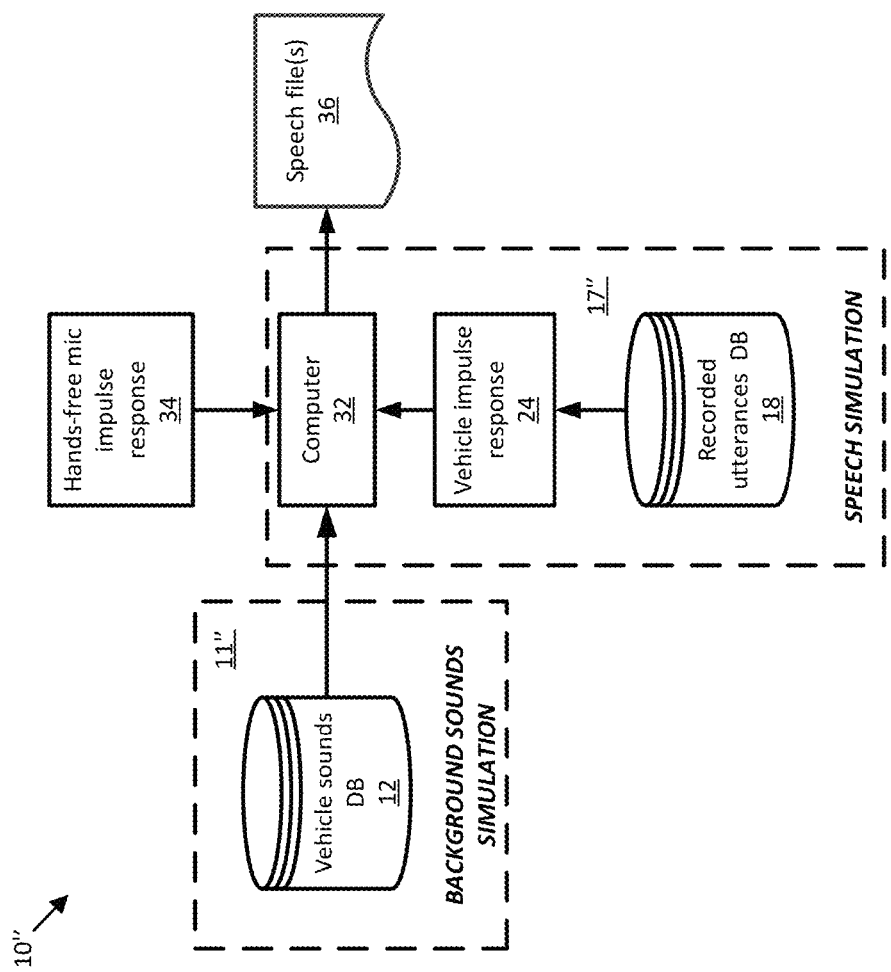
FIG. 3 is a block diagram of a third exemplary system for generating vehicle speech files.

FIG. 3 is a block diagram of a third exemplary system 10" for generating vehicle speech files 36. The system 10" omits both the HATS 26 and the human tester 38. A background sounds simulation subsystem 11" is provided in a manner similar to the subsystem 11' discussed above with respect to the system 10'. However, in the system 10", the system 17" differs from other variations in that the recorded utterances 18 are convolved with the vehicle impulse response and directly provided to the computer 32. In the computer 32, the convolved utterances are added to the vehicle background noise from vehicle sounds database 12. The resultant sound is further convolved with the hands-free microphone impulse response. Computer 32 thus generates one or more speech files 36 that have imposed upon them the influence of the hands-free microphone, vehicle acoustics and vehicle background noise. Output signals such as those described for systems 10 and 10'are also available for hands-free call quality and speech recognition evaluation. The utterance database 18, the recorded utterances convolved with the vehicle impulse response 24 with added background noise from vehicle sounds 12, along with the application of the speech files 36 to a hand-free phone processing system which produces a Bluetooth output signal, could provide the necessary signals for hands-free call quality evaluation. Additionally, the speech data from the Bluetooth output, sound output 30, and/or speech files 36 may be supplied to an automatic speech recognition engine to evaluate the performance of the speech recognition engine with speech utterances influenced by vehicle background noise, vehicle acoustics, hands-free microphone frequency response and Bluetooth processing. The speech files may also be used for the training of automatic speech recognition engines.

Figure 4:
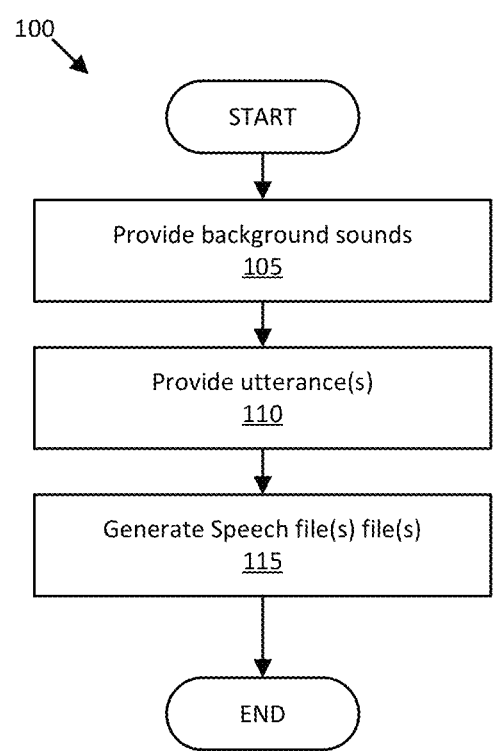
FIG. 4 is a process flow diagram illustrating an exemplary process for generating speech files.

FIG. 4 is a process flow diagram illustrating an exemplary process 100 for generating speech files 36. The process 100 may be practiced, with, as will be understood, appropriate variations, in one or more of the systems 10, 10', 10".

The process 100 begins in a block 105, in which vehicle sounds are recorded and stored in the database 12. As described above, one or more microphones may be placed in a vehicle cabin, and test parameters may be defined. Such parameters may include one or more of a vehicle speed, a test track road surface (e.g., unpaved, smooth, rough, and/or wet, etc.), and environmental condition (e.g., dry, soft rain, hard rain, snow, etc.), presence of sounds from a radio, volume of a radio, presence of passenger conversation, etc. Sounds may be recorded for a period of time and stored in the database 12 for one or more combinations of one or more of these or other parameters.

Next, in a block 110, one or more spoken utterances are provided as sound output 30 to the computer 32. As described above, one or more different sources for a spoken utterance may be used depending on whether a system 10, 10', or 10" is being used. For example, utterances may be provided from a database 18 of recorded utterances, or may be spoken by a tester 38. Further, utterances spoken by a tester 38, or provided from a database 18 to a HATS 26 and received by a microphone 28, may be equalized and/or convolved with an impulse response such as a vehicle impulse response 24, as described above. Accordingly, a source for an output sound 30 may be the microphone 28 and/or the database 18. Moreover, background sounds from the database 12 may be provided with spoken utterances and subjected to equalization as described with respect to the system 10 or added directly to the convolved utterances after convolving with the hands-free microphone impulse response 34.

Next, in a block 115, the computer 32 generates one or more speech files 36, e.g., as described above.

Following the block 115, the process 100 ends.

As mentioned above, results of the process 100, speech files 36, may be advantageously used in a variety of ways. For example, a spoken utterance could be generated with different sounds from the vehicle sounds database 12 to determine how various parameters for vehicle sounds affect hands-free calling, speech recognition, etc. In one simple example, an investigation could determine an association between an increase in noise level, (e.g., decibel level) and speech recognition. Further, speech files 36 may be used as training data for speech recognition, for validating hands-free calling commands, etc.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computing device that includes a processor and a memory, the memory storing instructions executable by the processor to:
  perform a first convolution that includes convolving a spoken utterance with a second acoustic impulse response that is based on acoustic characteristics of a vehicle cabin;
  receive output of a second convolution, of vehicle sounds retrieved from an electronic sound database with a first acoustic impulse response that is based on acoustic characteristics of a room, from a speaker in the room while recording the spoken utterance to generate output sounds that include the spoken utterance according to the first convolution; and generate a speech file from the output sounds.

2. The system of claim 1, wherein a source for the spoken utterance includes a database of recorded utterances.

3. The system of claim 2, wherein the spoken utterance is provided as a digital sound file from the database of recorded utterances to the computing device.

4. The system of claim 1, further comprising a microphone for receiving the at least one spoken utterance, wherein the at least one spoken utterance is provided to a microphone and converted to a digital sound file that is provided to the computing device.

5. The system of claim 4, further comprising a head and torso simulator that is arranged to provide the at least one spoken utterance to the microphone.

6. The system of claim 1, further comprising the electronic sounds database that stores the vehicle sounds, the vehicle sounds being sounds that were recorded during operation of a vehicle.

7. The system of claim 6, further comprising a speaker for providing the recorded vehicle sounds.

8. The system of claim 1, comprising at least one equalizer arranged to receive and adjust the at least one spoken utterance.

9. The system of claim 1, the instructions further including instructions to, before generating the speech file from the output sounds, perform a third convolution that includes convolving the output sounds with a third acoustic impulse response that is based on acoustic characteristics of a microphone.

10. The system of claim 9, wherein the third acoustic impulse response is a stored hands-free microphone impulse response.

11. A method, comprising:

performing a first convolution that includes convolving a spoken utterance with a second acoustic impulse response that is based on acoustic characteristics of a vehicle cabin;

receiving output of a second convolution, of vehicle sounds retrieved from an electronic sound database with a first acoustic impulse response that is based on acoustic characteristics of a room, from a speaker in the room while recording the spoken utterance to generate output sounds that include the spoken utterance according to the first convolution; and generating a speech file from the output sounds.

12. The method of claim 11, wherein a source for the spoken utterance includes a database of recorded utterances.

13. The method of claim 12, further comprising providing the spoken utterance as a digital sound file from the database of recorded utterances to the computing device.

14. The method of claim 11, further comprising using a microphone for receiving the at least one spoken utterance, wherein the at least one spoken utterance is provided to a microphone and converted to a digital sound file that is provided to the computing device.

15. The method of claim 14, further comprising providing a head and torso simulator that is arranged to provide the at least one spoken utterance to the microphone.

16. The method of claim 11, wherein the vehicle sounds were recorded during operation of a vehicle.

17. The method of claim 16, further comprising providing the recorded vehicle sounds from a speaker.

18. The method of claim 11, further comprising, before generating the speech files from the output sounds, performing a third convolution that includes convolving the output sounds with a third acoustic impulse response that is based on acoustic characteristics of a microphone.

19. The method of claim 18, wherein the third acoustic impulse response is a stored hands-free microphone impulse response.

20. The method of claim 11, further comprising providing at least one equalizer arranged to receive and adjust the at least one spoken utterance.

* * * * *